Nov. 5, 1968 — F. J. LA MERE — 3,409,060

VEGETABLE SLICING MACHINE

Filed July 13, 1966 — 2 Sheets-Sheet 1

INVENTOR.
FRANK J. LAMERE
BY Naylor & Neal
ATTORNEYS

United States Patent Office 3,409,060
Patented Nov. 5, 1968

3,409,060
VEGETABLE SLICING MACHINE
Frank J. La Mere, Mount Angel Towers,
Mount Angel, Oreg. 97362
Filed July 13, 1966, Ser. No. 564,824
2 Claims. (Cl. 146—124)

ABSTRACT OF THE DISCLOSURE

A vegetable slicing machine having an imperforate guide table and cutting knife mounted on a common shaft for rotation together with adjusting means for moving the table axially of the shaft with respect to the knife to adjust the depth of the cut of the knife. The guide table has a depression starting adjacent to the knife edge and trailing the knife with the depression having a terminal sloped portion extending axially toward the knife which functions to propel vegetable slices off of the guide table.

---

This invention relates to a slicing machine which can be used for cutting vegetables or other foods. More particularly, it relates to a food slicing machine which has a means for adjusting its slicing table with relation to its blades in order that the thickness of the food that is sliced can be readily controlled. Further, the slicing table has means for ejecting the sliced food from the slicing machine.

In one embodiment of the machine, the machine comprises a frame, a shaft rotatably mounted on the frame adapted to be rotated by an electric motor, a cutting blade mounted on the shaft and adapted to be rotated with the shaft, food positioning means comprising, a table mounted on the shaft, adapted to move axially on the shaft when the shaft is rotating, and adapted to rotate with the shaft; an arm is mounted on the frame with one end held by the frame and its other end engaging the table, and a control member engages an intermediate part of the arm for swinging the arm and changing the position of the table.

One of the disadvantages of prior adjustable slicing machines is the fact that the adjusting mechanism is likely to shift during operation responsive to vibration or the forces applied to the machine by the food being sliced. The machine of this invention employs a dependable control linkage for adjusting cutting depth.

Another disadvantage of prior adjustable slicing machines is the fact that the means by which the sliced food is removed is complex and undependable. The machine of this invention utilizes the slicing table itself to eject the sliced food.

Another object of this invention is to provide an adjustable slicing machine which can be adjusted while it is in operation.

Other objects and advantages will become more readily apparent to one skilled in the art upon reading the following specification and its appendant claims wherein:

Figure 1:
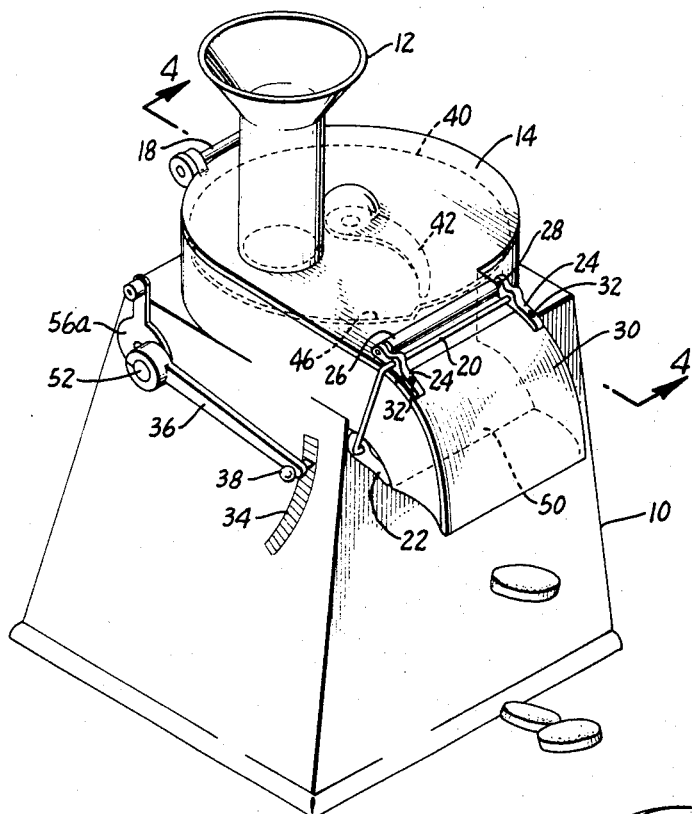
FIG. 1 is a perspective view of one embodiment of the machine.
Figure 3:
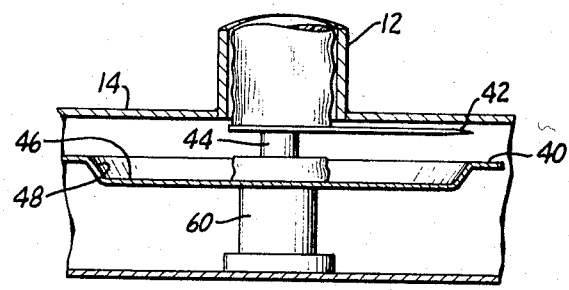
FIG. 3 is a sectional view taken along plane 3—3 of FIG. 2 including the funnel and the top plate of FIG. 1 which are not shown in FIG. 2.

Referring now in detail to the drawings and in particular to FIG. 1, the food slicing machine includes a housing 10, a funnel 12 mounted on the housing 10 to receive unsliced food. The funnel 12 extends through a top plate 14 which is pivotally mounted on the housing 10 by means of a pin 18. The top plate 14 is held on the frame 16 by means of a wire hinge 20. The wire hinge 20 is inserted in a cam member 22 and extends up and through brackets 24 which are rotatably mounted on the top plate 14 by means of a tube 26 and a rod 28. A cover plate 30 is attached to the brackets 24 by means of bolts 32. An embossed scale 34 is formed on one side of the frame 10 for use with an adjusting arm 36 and a hand pointer 38.

Figure 2:
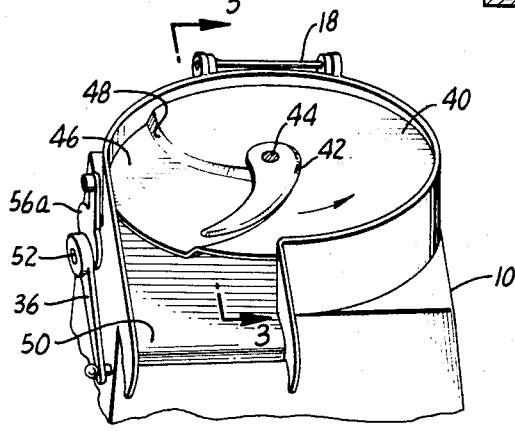
FIG. 2 is a perspective view of the top of the machine with a portion of it removed.

FIG. 2 illustrated the top of the food slicing machine 10 with the top plate 14 removed. A slicing table 40 and a cutting blade 42 are shown mounted on a shaft 44 for rotation with the shaft. A portion of the slicing table 40 is depressed at 46 to receive a freshly cut slice of food. Facing toward and trailing the depression 46 is an incline area 48 of the slicing table 40. The incline area 48 acts to facilitate the ejection of the food slices through an opening 50 under the cover plate 30. The leading edge of the depression 46 is provided immediately under the knife 42 to provide clearance for a food slice under the knife.

Thus, as can best be seen in FIG. 1, the food to be sliced is inserted in the funnel 12 and comes to rest on the slicing table 40 where the food is sliced by the cutting blade 42. The sliced food moves into the depression 46 from which it is ejected through the opening 50 by the inclined area 48.

Figure 5:
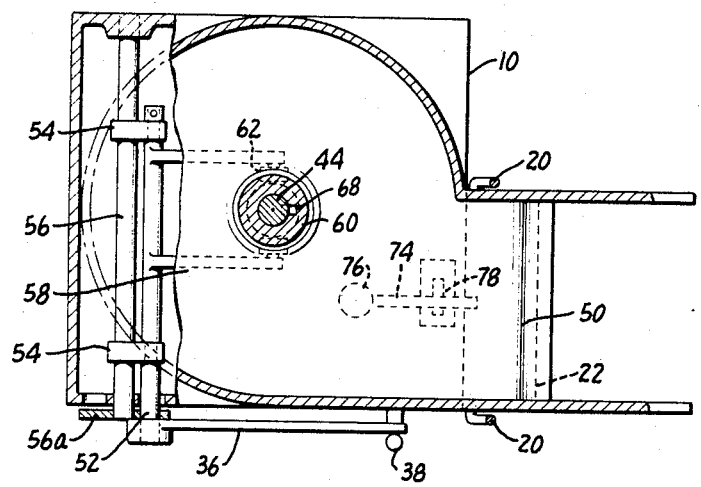
FIG. 5 is a sectional view taken along plane 5—5 of FIG. 4.
Figure 4:
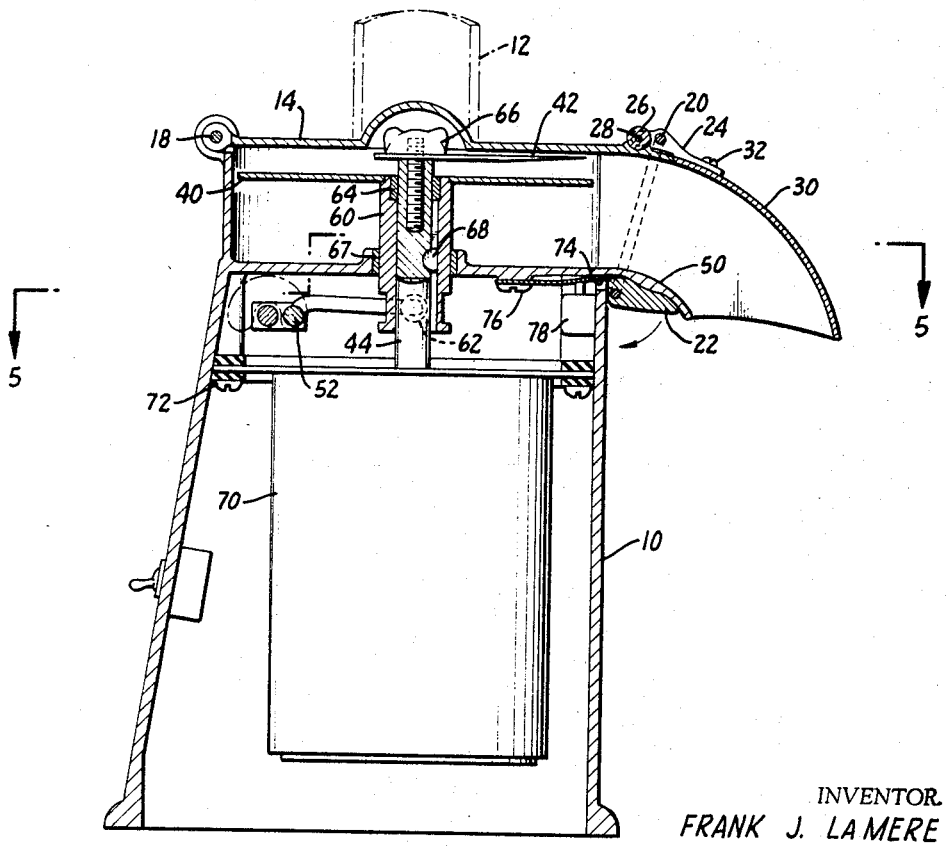
FIG. 4 is a sectional view taken along plane 4—4 of FIG. 1.

The relative position of the slicing table 40 to the cutting blade 42 determines the size of the slices of food. The mechanism by which the position of the slicing table 40 is controlled can best be seen in FIGS. 4 and 5. The marking arm 36 is mounted on a rod 52 which extends into the frame 10 and is supported by bearing 54. The bearings 54 are secured around a cross-member 56 which is mounted within the frame 10. The rod 52 has two arms 58 mounted on it which extend inwardly toward the shaft 44. The arms 58 engage a hub 60 of the slicing table by means of rollers 62. A gasket 64 fits around the shaft 44 and within the slicing table hub 60. The cutting blade 42 is secured to the shaft 44 by means of a bolt 66. The slicing table hub 60 is supported in a bearing 67 and connected to the shaft 44 by a key 68. Thus, both the cutting blade 42 and the slicing table 40 rotate with the shaft 44. The shaft 44 is rotated by an electric motor 70 which is secured to the frame 16 by means of a plate 72. A spring 74 is mounted on the frame 16 by means of a bolt 76 and is retained at its opposite end by means of the cam member 22. Located directly below the spring 74 is a micro-switch 78 which is mounted on the frame 16, and connected to the motor to prevent operation of the motor when the cover is open.

Thus, the relative position of the slicing table 40 may be controlled by rotating the marking arm 36 which in turn rotates the rod 52 thereby causing the arms 58 to rotate.

The relative positions of the rods 52 and 56 is controlled by a pivot member 56a which is mounted on the rod 56 and pivotally receives the rod 52. When the pivot member 56a is rotated, the rod 52 swings around the rod 56 to withdraw the rollers on arms 58 from the table hub 60 and permit the table to be removed upwardly for cleaning.

Should it be necessary to remove the top plate 14, the cam 22 can be rotated clockwise thereby releasing the wire hinge 20. The movement of the cam 22 in a clockwise direction also releases the spring 74 which causes the spring 74 to contact the micro-switch 78 hence preventing the motor 70 from being turned on. After the wire hinge 20 is rotated clear of the frame 16 the top plate 14 may be rotated about the pin 18 thereby providing access to the cutting blade 42 and slicing table 40.

It is understood that the invention is not intended to be limited to the detail of the exemplary embodiment illustrated and described herein.

Accordingly, what is claimed is:

1. A food slicing machine comprising:
   (A) a frame;
   (B) a shaft rotatably mounted on the frame and adapted to be rotated;
   (C) a cutting blade mounted on the top of the shaft and rigidly attached to the shaft for rotation therewith; and
   (D) a food positioning means comprising:
   (1) a continuous circular table:
      (a) mounted on the shaft adjacent to the blade underneath the blade,
      (b) for movement axially on the shaft while the shaft is rotating, and
      (c) for rotation with the shaft,
   (2) an elongated arm:
      (a) inside of the frame underneath the table,
   (3) means interconnecting the frame and one end of the arm;
   (4) bearing means interconnecting the table and the other end of the arm; and
   (5) adjustable support means engaging the arm and extending outwardly through said frame and having manually adjustable means outside of the frame for changing the distance between the blade and table.

2. A food slicing machine comprising:
   (A) frame;
   (B) a shaft rotatably mounted on the frame and adapted to be rotated;
   (C) a cutting blade mounted on and extending radially from the shaft and adapted to be rotated with the shaft, and;
   (D) a food positioning and ejection means comprising a table mounted on the shaft and extending radially from the shaft adjacent to the blade with said table adapted to rotate with the shaft and having a depression in the surface of the table with a forward slope adjacent to and extending axially away from the blade for providing clearance for food slices as they are cut by the blade and a rearward slope positioned circumferentially of said table behind the blade and extending axially toward the blade for engaging food slices cut by the blade and propelling said slices off of the table.

References Cited

UNITED STATES PATENTS

| | | | |
|---|---|---|---|
| 1,123,176 | 12/1914 | Cronk | 146—124 X |
| 1,616,655 | 2/1927 | Gilchrist | 146—68.1 |
| 1,898,160 | 2/1933 | Aeschbach | 146—124 |
| 1,962,847 | 6/1934 | Streckfuss | 146—125 X |
| 2,453,140 | 11/1948 | Kubaugh | 146—124 |

W. GRAYDON ABERCROMBIE, *Primary Examiner.*